US009145762B2

(12) United States Patent
Aytkhozhina et al.

(10) Patent No.: US 9,145,762 B2
(45) Date of Patent: Sep. 29, 2015

(54) GRAVEL PACK FLUID COMPOSITION AND EMULSION THEREFOR

(75) Inventors: Dana Aytkhozhina, Middlesex (GB); Roman Vladimirovich Bulgachev, Middlesex (GB); Martin Alexander Ross, Middlesex (GB); Allan Jeffrey Twynam, Middlesex (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 0 days.

(21) Appl. No.: 13/392,131

(22) PCT Filed: Aug. 20, 2010

(86) PCT No.: PCT/GB2010/001584
§ 371 (c)(1),
(2), (4) Date: Feb. 24, 2012

(87) PCT Pub. No.: WO2011/023940
PCT Pub. Date: Mar. 3, 2011

(65) Prior Publication Data
US 2012/0165233 A1 Jun. 28, 2012

(30) Foreign Application Priority Data

Aug. 28, 2009 (EP) ..................................... 09252090

(51) Int. Cl.
C09K 8/588 (2006.01)
E21B 43/04 (2006.01)
C09K 8/36 (2006.01)

(52) U.S. Cl.
CPC .. *E21B 43/04* (2013.01); *C09K 8/36* (2013.01)

(58) Field of Classification Search
CPC ............ C09K 8/60; C09K 8/64; C09K 8/524; E21B 43/04
USPC .......... 507/221, 267, 265, 263, 260; 166/278, 166/51, 305.1, 270.1
See application file for complete search history.

(56) References Cited

U.S. PATENT DOCUMENTS

| 2,285,291 | A | * | 6/1942 | Larsen ........................... 166/278 |
| 3,974,877 | A | | 8/1976 | Redford |
| 4,595,513 | A | | 6/1986 | Morgenthaler et al. |
| 5,602,083 | A | | 2/1997 | Gabrysch et al. |
| 5,710,111 | A | | 1/1998 | Van Slyke |
| 7,419,004 | B2 | * | 9/2008 | Salamat ......................... 166/278 |
| 2001/0036905 | A1 | | 11/2001 | Parlar et al. |
| 2005/0139354 | A1 | | 6/2005 | Salamat |
| 2005/0250652 | A1 | | 11/2005 | Taylor et al. |
| 2006/0272815 | A1 | | 12/2006 | Jones et al. |

FOREIGN PATENT DOCUMENTS

| WO | WO 96/30460 | 10/1996 |
| WO | WO 96/30460 A1 | 10/1996 |
| WO | WO 01/61148 A2 | 8/2001 |
| WO | WO 2008/129160 A2 | 10/2008 |

OTHER PUBLICATIONS

Santa Cruz Biotechnology Product Block for Sorbitan Monooleate (CAS 1338-43-8), Copyright © 2007-2014. http:www.scbt.com/datasheet-281153.html.*
Copeland, T., et al; *47th Annu SPE of Aime Fall MTG Preprint No. SPE-4033*, 11 pgs (1972).
Quintero, L., et al; *American Association of Drilling Engineers National Technical Conference [2007 AADE]* (Houston, TX, Apr. 10-12, 2007), Proceedings 2007 (Paper No. AADE-07-NTCE-17).
Wagner, M., et al; *SPE Formation Damage Contr. Int. Symp.* (Lafayette, LA, Feb. 18-20, 2004) PAP; SPE Drilling & Completion v.21, No. 1 pp. 32-43, Mar. 2006 (ISSN 1065-6671; SPE-87648).
Ofoh, E.P., et al; *IADC/SPE Drilling Conference* (Miami Beach, FL Feb. 21-23, 2006 Proceedings 2006 (IADC/SPE-98151).
Ladva, H.K.J., et al; *Annu. SPE Europe Formatin Damage Conf.* (The Hague, Netherlands, May 21-22, 2001) Proc. 2001 (SPE-68959).
Kelkar, S., et al; *SPE Oilfield Chem. Int. Symp.* (Houston, TX, Feb. 13-16, 2001) Proc. 2001 (SPE-64978).
Hecker, M.T., et al; "Reducing Well Coast by Gravel Packing in Nonaqueous Fluid"; *Annual SPE Tech. Conf.* (Houston, TX, Sep. 26-29, 2004) Proc. 2004 (SPE 90758), 7 pgs.
Dahl, J., et al; "Uses of Small Particle Size Cement in Water and Hydrocarbon Based Slurries"; *9th Kansas Univ., et al. Tertiary Oil Recovery Conf.* (Wichita, Kansas, Mar. 6-7, 1991) Proc., pp. 25-29 (1991).
Kemick, J.G., et al; "Drilling and Gravel Packing with an Oil Base Fluid System"; *43rd Ann SPE of Aime Fall Mtg* Sep. 29, 1968-Oct. 2, 1968 Preprint No. SPE 2190, 12 pgs.
PCT International Preliminary Report on Patentability dated Mar. 8, 2012, International Application No. PCT/GB2010/001584; International filing date Aug. 20, 2010 (8 pgs).
Hecker, M.T., et al; *Annu. SPE Tech. Conf.* (Houston, TX, Sep. 26-29, 2004) Proc. 2004 (SPE-09758).
Dahl, J., et al; *9th Kansas Univ., et al. Tertiary oil Recovery Conf.* (Wichita, Kansas, Mar. 6-7, 1991) Proc. pp. 25-29 (1991).
Kemick, J.G., et al; *43rd Ann SPE of Aime Fall Mfg* Sep. 29, 1968-Oct. 2, 1968 Preprint No. SPE 2190, 12 pgs.

* cited by examiner

*Primary Examiner* — Susannah Chung
*Assistant Examiner* — Atnaf Admasu
(74) *Attorney, Agent, or Firm* — Nixon & Vanderhye P.C.

(57) ABSTRACT

Gravel pack composition containing gravel and a water-in-oil emulsion including (a) an organic continuous phase comprising 0.1 to 5 vol % of the emulsion of non-ionic or cationic surfactant and 0.25 to 3 vol % of the emulsion of sorbitan ester; (b) a dispersed aqueous phase comprising 0.05 to 3 vol % of the emulsion of a partial ester of a polyol with at least one C6 to C22 fatty acid and at least one of an acid, acid precursor, and a chelating agent; and (c) a density control agent. The fluid can display a delayed break of up to about 72 hours to enable clean-up of mud cake.

2 Claims, No Drawings

GRAVEL PACK FLUID COMPOSITION AND EMULSION THEREFOR

This application is the U.S. national phase of International Application No. PCT/GB2010/001584 filed 20 Aug. 2010 which designated the U.S. and claims priority to European Application No. 09252090.7 filed 28 Aug. 2009, the entire contents of each of which are hereby incorporated by reference.

The present invention relates to gravel pack compositions, methods of making the compositions and emulsions for use in gravel packs.

The introduction of "gravel packs" into drilled wellbores is well known. The gravel, which is in the form of a coarse sand or a ceramic material, acts as a filter to minimise particulate production and migration in production and injection wells in a hydrocarbon reservoir, particularly fine sand production. Such particulates can cause significant wear to completion screens and equipment, pipework, pumps, valves and other equipment used to extract hydrocarbons from a reservoir, as well as presenting the issue of handling large amounts of oily sand at the surface. In addition to erosion and handling issues such particulates may cause significant productivity/injectivity impairment associated with the produced sand filling the well.

In general, the conventional method of gravel placement, involves introducing the gravel using a carrier fluid pumped into an area between a suitable screen placed in the wellbore and the formation itself. Proper selection of the carrier fluid is essential. Carrier fluids may be either "water-based" or "oil-based", and may be single phase carrier fluids or may be in the form of emulsions. For example, a water-in-oil emulsion comprises droplets of a water (or aqueous phase) suspended in a continuous oil phase.

The majority of commercially available carrier fluid formulations are "water-based". Such fluids generally comprise metal salts, and may also be referred to as brines or "brine based" fluids, to control their density and make them more suitable for use in particular formations. However, one drawback of water-based carrier fluids is that they can be incompatible with oil-based drilling fluids which have previously used in the formation. Oil-based carrier fluids have therefore been proposed, including water-in-oil emulsions.

WO 01/61148, for example, relates to filter cake clean-up and gravel pack methods for oil based and water based drilling fluids. In this disclosure a "pH modifying agent" is included in a carrier fluid which acts to "flip" a water-in-oil emulsion already present in the filter cake (deposited on the wall of the wellbore from the drilling fluid) to an oil-in-water emulsion, such that the filter cake can be cleaned up by the agents therein. This disclosure is specific to systems which themselves have utilised a water-in-oil emulsion as drilling fluid.

WO 2008/129160 describes a completion fluid for a water injection well. In a production wellbore, fluid flows from the formation into the wellbore. In a water-injection well, fluid flows from the wellbore into the formation. Consequently solids from the mud, which formed a cake on the sandface during drilling operations, may be driven into pores in the formation during water injection. The emulsion of WO 2008/129160 is stable for a short time to enable it to be pumped but breaks within about 24 hours to allow the products within both phases to act on the formation.

US 2005/139354 relates to a method of gravel packing with an oil-based carrier fluid. The fluid is a water-in-oil emulsion, and includes a specific emulsifier based on a selected sorbitan fatty acid ester having a defined GPC peak.

According to the present invention there is provided:
1. A gravel pack composition comprising
   i) a water-in-oil emulsion comprising:
      a) an organic continuous phase comprising 0.1 to 5 vol % of the emulsion of non-ionic or cationic surfactant and 0.25 to 3 vol % of the emulsion of sorbitan ester;
      b) a dispersed aqueous phase comprising 0.05 to 3 vol % of the emulsion of a partial ester of a polyol with at least one $C_6$ to $C_{22}$ fatty acid and at least one of an acid, an acid precursor, and a chelating agent; and
      c) a density control agent; and
   ii) gravel.
2. A gravel pack composition as set forth in paragraph 1 wherein the nonionic or cationic surfactant comprises an ester of a polymerised unsaturated monocarboxylic fatty acid.
3. A gravel pack composition as set forth in paragraph 1 or paragraph 2 wherein the sorbitan ester comprises sorbitan monooleate.
4. A gravel pack composition as set forth in any one of paragraphs 1 to 3 wherein the acid is selected from the group consisting of formic acid, acetic acid, propionic acid and citric acid.
5. A gravel pack composition as set forth in any one of paragraphs 1 to 4 wherein the chelating agent comprises sodium or potassium salts of polyaminocarboxylic acids.
6. A gravel pack composition as set forth in any one of paragraphs 1 to 5 wherein the partial ester of a polyol comprises fatty acid esters of a mixture of glycerol, monoglycerol, diglycerol, triglycerol, tetraglycerol and pentaglycerol.
7. A gravel pack composition as set forth in any one of paragraphs 1 to 6 wherein the density control agent comprises a water soluble salt the cation of which is selected from the group consisting of calcium, magnesium, cesium, sodium and potassium and the anion of which is selected from the group consisting of formate, chloride and bromide.
8. A gravel pack composition as set forth in any one of paragraphs 1 to 7 wherein the gravel has a US mesh size of between 12 mesh and 70 mesh.
9. A kit of parts comprising
   i) a water-in-oil emulsion comprising:
      a) an organic continuous phase comprising 0.1 to 5 vol % of the emulsion of non-ionic or cationic surfactant and 0.25 to 3 vol % of the emulsion of sorbitan ester;
      b) a dispersed aqueous phase comprising 0.05 to 3 vol % of the emulsion of a partial ester of a polyol with at least one $C_6$ to $C_{22}$ fatty acids and at least one of an acid, an acid precursor, and a chelating agent; and
      c) a density control agent and
   ii) gravel.
10. A method of making a gravel packing composition comprising mixing
   i) a water-in-oil emulsion comprising:
      a) an organic continuous phase comprising 0.1 to 5 vol % of the emulsion of non-ionic or cationic surfactant and 0.25 to 3 vol % of the emulsion of sorbitan ester;
      b) a dispersed aqueous phase comprising 0.05 to 3 vol % of the emulsion of a partial ester of a polyol with at least one $C_6$ to $C_{22}$ fatty acid and at least one of an acid, an acid precursor, and a chelating agent; and
      c) a density control agent and
   ii) gravel.

11. A method of gravel packing a borehole in a subterranean formation comprising the step of pumping into the borehole a gravel pack composition as set forth in any one of paragraphs 1 to 9.

12. The use of a water in oil emulsion comprising:
   a) an organic continuous phase comprising 0.1 to 5 vol % of the emulsion of non-ionic or cationic surfactant and 0.25 to 3 vol % of the emulsion of sorbitan ester;
   b) a dispersed aqueous phase comprising at least one of an acid, an acid precursor, and a chelating agent and 0.05 to 3 vol % of the emulsion of a partial ester of a polyol with at least one $C_6$ to $C_{22}$ fatty acid; and
   c) a density control agent as a carrier fluid in gravel packing a borehole in a subterranean formation.

13. A water in oil emulsion comprising:
   a) 30 to 70 vol % of the emulsion of an organic continuous phase comprising a base oil and a 0.3 to 3 vol % of the emulsion of a sorbitan ester;
   b) a dispersed aqueous phase comprising at least one of an acid, an acid precursor, and a chelating agent, and 0.2 to 2 vol % of the emulsion of a partial ester of a polyol with at least one $C_6$ to $C_{22}$ fatty acid; and
   c) a density control agent.

The base oil that is a component of the continuous organic phase of the emulsion may be any organic base oil, such as a petroleum cut (for example, a gas oil, gasoline, or kerosene cut), a vegetable oil or an animal oil. Base oils that may also be used in drilling fluids, are particularly suitable. One example of suitable base oils is Clairsol products, e.g. Clairsol 370, sold by Petrochem Carless Ltd.

The base oil typically comprises 10 to 70 vol % of the emulsion, more preferably 15 to 60 vol % of the emulsion, yet more preferably 20 to 50 vol % of the emulsion.

The continuous organic phase of the emulsion contains at least one surfactant typically a non-ionic or cationic surfactant of the following types: ethylene oxide and propylene oxide copolymers; alcohol or phenol derivatives with alkoxylated or polyalkoxylated linkages; polyalkylene glycols; polyamines; alkoxylated or polyalkoxylated amine derivatives; quaternary ammonium salts; quaternised alkanol amine esters, and siliconised derivatives; non-ionic amphiphilic compositions obtained by the reaction of at least one polymerised vegetable oil with at least one aminoalcohol; the alkyl esters of fatty acids derived from natural, vegetable or animal oils, optionally alkoxylated or polyalkoxylated, as well as any other derivative of fatty acids, in particular polymerised unsaturated monocarboxylic fatty acids. The organic phase of the emulsion may optionally contain an anionic surfactant. Optionally, solvents may also be present in the organic phase of the emulsion. One example of a suitable composition is Radiagreen CLO™, sold by Oleon.

The organic continuous phase further comprises an emulsifier. The emulsifier is typically a sorbitan ester such as a sorbitan mono-, di- or triester or a mixture thereof. In order for the emulsion to be sufficiently stable and viscous more than 0.2 vol % of the emulsion, preferably at least 0.25 vol % more preferably at least 0.35 vol %, for example, at least 0.5 vol % of the emulsion should be emulsifier. The upper limit of the amount of emulsifier is typically 3 vol %, preferably, 2 vol %, for example, 1 vol %.

Where the gravel pack composition is to be used at a downhole temperature of above 105° C., it is preferred that the composition comprises a high temperature emulsion stabilizer. This high temperature emulsion stabilizer is a component of the organic phase of the emulsion. The high temperature emulsion stabilizer is suitably an alkoxylated fatty acid, preferably an ethoxylated fatty acid formed by reaction of a polyethylene glycol with a fatty such as lauric acid, stearic acid and oleic acid. The molecular weight of the ethoxylated fatty acid may be in the range of from 200 to 1000, typically being in the range of 400 to 600. One example of a suitable high temperature emulsion stabilizer is polyethylene glycol monooleate having a molecular weight of about 600. In order for the emulsion to be sufficiently stable and viscous at a temperature of above 105° C., it is preferred that at least 0.02 vol % of the emulsion, preferably at least 0.03 vol %, more preferably at least 0.05 vol % of the emulsion is comprised of the high temperature emulsion stabilizer. The upper limit for the amount of high temperature emulsion stabilizer is typically 2 vol %, preferably, 1 vol %, more preferably, 0.5 vol %, for example, 0.25 vol %.

The dispersed aqueous phase of the emulsion may contain an acid, acid precursor, chelating compound or mixtures thereof for removing calcium carbonate, magnesium carbonate or dolomite particles that are present in a filter cake that is deposited on the walls of the wellbore during drilling of the wellbore. Examples of suitable acids include one or more organic acids, especially selected from formic acid, acetic acid, propionic acid and citric acid or inorganic acids such as hydrochloric or hydrofluoric acid. Acid precursors are additives which release acid in situ. Examples of suitable acid precursors include carboxylic acid esters, such as methyl or ethyl esters of formic acid, acetic acid and lactic acid. The acids typically dissolve calcium carbonate, magnesium carbonate or dolomite particles but are not effective against barium sulphate particles. Chemicals which may be utilised to remove barium sulphate particles have been identified however, and include chemicals such as HDC Mark II and HDC Mark III, sold by Well Flow International LLC. Such chemicals are also generally capable of removing calcium carbonate particles, but are generally relatively expensive compared to many of the other compounds capable of calcium carbonate removal. As an alternative or in addition to employing an acid or acid precursor, chelating agents may be included in the dispersed aqueous phase and may be especially useful for dissolving barium sulphate. Examples include alkali metal or ammonium salts of polyaminocarboxylic acid chelating agents such as aqueous solutions of di-alkali metal or ammonium salts (preferably di-potassium salts) of ethylenediamine tetraacetic acid, cyclohexylene dinitrilo tetraacetic acid, ethylenebis(oxyethylenenitrilo)tetraacetic acid, carboxymethylimino-bis(ethylenenitrilo), tetraacetic acid, hydroxyethylethylenediamine triacetic acid and hydroxyethyliminodiacetic acid. Preferably, the chelating agent is selected from ethylenediaminetetraacetic acid (EDTA)-type chemicals, one or more salts thereof, such as sodium or potassium salts, and combinations thereof. Optionally pH buffers and chemicals that aid dissolution of barium sulphate may be incorporated in the dispersed aqueous phase in addition to the chelating agent. An example of a pH buffer is potassium hydroxide; and examples of chemicals that aid dissolution of barium sulphate are potassium carbonate and potassium formate.

One or more surfactants capable of aiding dissolution of calcium carbonate and/or barium sulphate particles (a component of the filter cake that is formed on the walls of the wellbore during a drilling operation) may also be present in the gravel pack composition of the present invention. The one or more surfactants capable of aiding dissolution of the calcium carbonate and/or barium sulphate particles may comprise at least one constituent chosen from non-ionic or cationic surfactants of the following types: ethylene oxide and propylene oxide copolymers; alcohol or phenol derivatives with alkoxylated or polyalkoxylated linkages; polyalkylene glycols; polyamines; alkoxylated or polyalkoxylated amine derivatives; quaternary ammonium salts; quaternised alkanol amine esters, and siliconised derivatives; non-ionic amphiphilic surfactants obtained by the reaction of at least one polymerised vegetable oil with at least one amino-alcohol, and the alkyl esters of fatty acids derived from natural, vegetable or animal oils, optionally alkoxylated or polyalkoxylated fatty acid derivatives, as well as any other derivative of fatty acids, in particular polymerised unsaturated monocarboxylic fatty acids. These surfactants are components of the continuous organic phase of the emulsion.

The dispersed aqueous phase of the emulsion comprises one or more partial esters of polyols with at least one $C_6$-$C_{22}$ fatty acid. Preferably the chain length of the fatty acid lies between $C_6$ and $C_{12}$ and in still more preferred manner between $C_8$ and $C_{10}$. The molar ratio of the number of free hydroxyl groups to the number of hydroxyl groups esterified by a fatty acid is preferably at least 1:1, more preferably at least 2:1, most preferably 3:1. Preferably, the emulsion comprises a mixture of partial esters of polyols prepared by esterifying a mixture of at least two polyols selected from glycerol, monoglycerol, diglycerol, triglycerol and higher glycerols with a fatty acid. An example of a suitable composition is Radiagreen RA™ sold by Oleon. The partial ester of the polyol desirably has poor solubility in the dispersed or discontinuous aqueous phase since this may help maintain the initial surface active properties of the emulsion. At least a portion of the partial ester of the polyol may be dispersed rather than dissolved in the aqueous phase. Typically 0.05 to 3 vol % of the emulsion, more preferably at least 0.1 vol % of the emulsion yet more preferably at least 0.2 vol % of the emulsion is a partial ester of a polyol. The upper limit of the amount of the partial ester of the polyol may be 1 or 2 vol %.

The discrete or discontinuous aqueous phase of the emulsion of the present invention also comprises a density control agent such as one or more metal salts. The salts are added, as is known in the art, to control the density of the carrier fluid (the water-in-oil emulsion component of the gravel pack composition) such that the carrier fluid has a sufficient density that the static head in the wellbore corresponds to the formation pressure in the wellbore for the well control purposes. The metal salts should be water-soluble, and preferably are alkali metal or alkaline earth metal salts. Particular examples of suitable salts include NaCl, NaBr, KCl, KBr, $NaNO_3$, HCOONa, HCOOK, HCOOCs, $K_2SO_4$, $CH_3COOK$, $CH_3COONa$, $CH_3COOCs$, $Na_2CO_3$, $K_2CO_3$ and mixtures thereof. Divalent salts may also be used provided that the gravel pack carrier fluid does not comprise a chelating agent capable of reacting with divalent ions. Examples of suitable divalent salts include $CaCl_2$, $CaBr_2$, $MgCl_2$, $ZnBr_2$ and mixtures thereof. The preferred salts are halide salts, especially chloride and bromide salts, and mixtures thereof; and carboxylic acids salts, especially formates, and mixtures thereof. The most preferred salts are NaCl, NaBr, KCl, HCOOK, HCOONa and HCOOCs and mixtures thereof, for example a mixture of HCOOK and HCOOCs.

The emulsion that serves as a carrier fluid for the gravel typically has an emulsion breaking time of between 24 and 96 hours, preferably between 48 to 72 hours. The breaking time may be measured by forming the emulsion and leaving it to break (settle and separate) at reservoir temperature. As the emulsion breaks, the emulsion phase reduces in volume and separates into water and oil phases. As used herein, the full breaking time is defined as the time when the volume of the emulsion phase reduces by 100% compared to the initial volume.

The emulsion of the invention preferably has thermal stability of up to 135° C. (up to 220° F.). Stability is measured by forming the emulsion and leaving it to break at a range of simulated reservoir temperatures. However thermal stability may be increased (or decreased) when using different additives at different concentrations, e.g., emulsion breaker, emulsifier and optional high-temperature emulsion stabilizer, as particular well conditions dictate, to aid higher (or lower) thermal stability.

The emulsion of the present invention typically displays rheological stability at temperatures of up to 135° C. Stability of the emulsion may be measured at temperatures of up to 93° C. using a Fann Model 35 concentric cylinder rotational viscometer in R1/B1/F1 configuration, powered by an electric motor. At temperatures above 93° C., emulsion stability may be measured using an Ofite Model 1100 high-pressure high-temperature viscometer. Rheological stability is measured by forming the emulsion and measuring its rheological properties across the range of simulated reservoir temperatures. However, rheological stability of the emulsion may be increased (or decreased) by using different additives at different concentrations, e.g., emulsion breaker, emulsifier, and optional high-temperature emulsion stabilizer, as particular well conditions dictate, to aid higher (or lower) rheological stability.

The emulsion of the present invention generally has stability under contamination with 3 wt % simulated drill solids (Rev Dust), 10% v/v simulated formation water and 50% v/v oil-based drilling fluid (OBM). Stability under contamination may be measured using a Fann Model 35 concentric cylinder rotational viscometer in R1/B1/F1 configuration, powered by an electric motor or an Ofite Model 1100 high-pressure high-temperature viscometer. Stability under contamination may be determined by forming the emulsion, contaminating it with the simulated drill solids, or simulated formation water, or oil-based drilling fluid (OBM), and measuring its rheological properties at the American Petroleum Institute (API) recommended temperature of 49° C. (120° F.).

The density of the emulsion is typically at least 0.90 g/cm³ (7.5 pounds per US gallon (ppg)) for example, at least 1.105 g/cm³ (8.8 ppg), at least 1.16 g/cm³ (9.7 ppg) or at least 1.76 g/cm³ (14.7 ppg). The maximum density of the emulsion is not especially limiting but may be 2.10 or 2.30 g/cm³ (17.5 or 19.2 ppg). The density of the fluid is preferably sufficient to control the well (prevent in-flow of fluids from the surrounding formation) during open-hole gravel packing operations.

Additional chemicals can be added for improving the performance of the gravel pack carrier fluid, provided they do not compromise the gravel pack carrier fluid properties.

These include but are not limited to, scale inhibitors, bactericides, surfactants, visco-elastic surfactants, foaming and defoaming agents, solid and liquid lubricants, thinners, oxygen scavengers, $H_2S$ and $CO_2$ scavengers, water hardness control chemicals, corrosion inhibitors, gas-hydrate inhibitors, demulsifiers and surfactants designed to assist the clean-up of fluid that has invaded the reservoir rock, solid and liquid shale stabilizers, enzymes, bridging particulates to prevent loss of fluid from the gravel pack fluid into highly permeable zones and/or into natural or induced fractures in the wall of the wellbore, weighting agents, and combinations thereof.

The gravel pack composition of the invention includes gravel. Gravels known to those skilled in the art to be useful in water in oil emulsions may be used. The amount of gravel present can be 400 to 100 grams per liter of emulsion, preferably at least 500, more preferably at least 600 grams per liter of emulsion. Typically gravel having a narrow particle size distribution is used, for example between 1680 and 1000 micron (12 and 18 US Mesh) or between 420 and 210 micron (40 and 70 US Mesh), such as 12/18 US Mesh or 40/70 US Mesh.

The invention provides an emulsion which is stable enough and of the right viscosity to enable suspension of a gravel therein and wherein delayed breaking of the emulsion enables clean-up of the mud cake that has deposited on the walls of the wellbore during the preceding drilling operation. During drilling with an oil-based mud, because the pressure in the wellbore is generally higher than that of the formation, the solid particles of the mud form a deposit, called a "cake", on the walls of the well, which enables the stability of the walls to be maintained and the loss of fluid from the gravel pack fluid to the rock formation to be limited. The deposited cake therefore contains filtrate reducing additives whose main function is to limit the quantities of filtrate invading the formation. The cake will result in a diminution of the permeability of the rock and hence of the productivity or injectivity of the well. A cleaning process is therefore necessary in order to obtain the best possible oil production or water injection. Chemicals are often employed in order to destroy the filter cake and to clean the damaged zone of the formation surrounding the drilled wellbore, so that the formation recovers its liquid flow properties (permeability). The invention provides a gravel packing composition which in at least some embodiments provides good cake breaking performance. In particular, as discussed above, the acid, acid precursor or chelating agent that forms a component of the discrete aqueous phase of the water in oil emulsion are effective in removing barium sulphate, calcium carbonate, magnesium carbonate or dolomite particulate material from the filter cake.

A particular further advantage of the present invention is that the emulsion of the present invention has been found to maintain stable rheological properties across a range of temperatures and in the presence of a range of contaminants. Moreover the emulsion of the present invention will break (separate) within a specific time period, dependant on the concentrations of emulsifying agent, high temperature emulsion stabilizer (if employed), and the emulsion breaker and also on the downhole temperature. The fluid formulation may be adjusted in the laboratory to meet the requirements of the oil field in which the gravel packing composition is to be deployed. For example, the viscosity specifications of the emulsion at temperatures in the range of 17 to 135° C. (80 to 220° F.) may be a Yield Point in the range of 6.2 to 14.4 Pa (13 to 30 $lb_f/100$ $ft^2$) and a Plastic Viscosity in the range of 13 to 45 mPa·s (cP), as measured using a Fann Model 35 concentric cylinder rotational viscometer in R1/B1/F1 configuration, powered by electric motor or an Ofite Model 1100 high-pressure high-temperature viscometer. It has been shown that the rheological properties may be maintained in the presence of drilling muds, formation water and drill solids at potential "down-hole" contaminant levels. It has also been shown that the emulsion breaks (separate) within the desired time period under reasonable contamination with drilling muds, formation water and drill solids. Thus, the emulsion is suitable for suspending and placing the gravel under typical conditions down-hole and will break (separate) within the desired time period to release the agents that dissolve components of the filter cake thereby cleaning up the filter cake. In use, the emulsion has been found to cause comparable or lower formation damage than currently used gravel pack carrier fluids.

The present invention will now be illustrated by the following Examples.

EXAMPLES

Carrier Fluid Formulations

Water-in-oil emulsions for use as Carrier Fluids were prepared having the compositions shown in the Table below. Formulations 1, 2 and 4 were found to have a density of 1.20 $g/cm^3$ (10.0 ppg or 1.20 SG) while Formulation 3 had a density 1.03 $g/cm^3$.

| Product Name | Formulation 1, vol % | Formulation 2, vol % | Formulation 3, vol % | Formulation 4 (comparative), vol % |
| --- | --- | --- | --- | --- |
| Potassium Formate Brine (density 1.61 $g/cm^3$ (SG)) | 12.24 | 29.15 | — | 12.20 |
| Cesium Formate Brine (density 2.193 $g/cm^3$ (SG)) | 12.24 | — | — | 12.20 |
| Sodium Chloride Brine (density 1.20 $g/cm^3$) | — | — | 16.52 | — |
| Sodium Bromide Brine (density 1.40 $g/cm^3$) | — | — | 8.25 | — |
| Acetic Acid (glacial) | 0.86 | 0.88 | 0.87 | 0.86 |
| HDC Mark III | 24.47 | 20.11 | 24.76 | 24.4 |
| Radiagreen RA | 0.35 | 0.20 | 0.10 | 0.35 |
| Base Oil | 48.90 | 48.71 | 48.09 | 49.35 |
| Radiagreen CLO | 0.45 | 0.45 | 0.45 | 0.44 |
| Sorbitan Monooleate | 0.50 | 0.35 | 0.89 | 0.20 |
| D040 | — | 0.15 | — | — |
| Polyethylene Glycol Monooleate (Molecular Weight 600) | — | — | 0.07 | — |

Laboratory Tests with Formulation 1:
1. Emulsion Separation and Gravel Settling Tests These tests were performed using the following procedures:
1. 500 ml of a water-in-oil emulsion (carrier fluid) were prepared at room temperature using a Silverson mixer by: mixing separately the aqueous phase (stir for 5 minutes at 5000 RPM) and the oil phase (stir for 5 minutes at 5000 RPM); adding half of the aqueous phase to the oil phase (stir for 5 minutes at 6000 RPM); and then adding the remaining half of the aqueous phase (stir for 5 minutes at 6000 RPM).
2. 398 ml of the carrier fluid were placed into a Hamilton Beach mixer cup.
3. 238.8 g of gravel were added to the carrier fluid (final volume approx 500 ml).
4. The gravel and carrier fluid were mixed for 30 seconds using the Hamilton Beach mixer.
5. The resulting suspension (gravel pack composition) was placed in a 500 ml graduated cylinder.
6. The cylinder was placed in an oven that was heated to a temperature of 82° C. (180° F.).
7. The contents of the cylinder were monitored for fluids separation against time and sand (gravel) settling.

| Fluid containing 30/50 Carbolite Gravel, heated to 82° C. (180° F.) | | |
|---|---|---|
| Time (min) | Emulsion Separation (%) | Gravel Settling (%) |
| 5 | 5 | 2.9 |
| 10 | 10 | 5.9 |
| 15 | 15 | 8.8 |
| 20 | 20 | 11.8 |
| 25 | 25 | 14.7 |
| 30 | 30 | 17.6 |
| 35 | 35 | 20.6 |
| 60 | 45 | 26.5 |
| 120 | 60 | 35.3 |
| 180 | 70 | 41.2 |
| 16 hr | 85 | 50.0 |
| 24 hr | 87.5 | 51.5 |
| 48 hr | 100 | 100.0 |

2. Formation Damage Tests

The following permeability testing procedure was implemented:
1. Vacuum saturate a cylindrical core plug with formation water.
2. Load the core plug into a cylindrical cell that is provided with an inlet and outlet at each end thereof and apply a confining pressure of 7 MPa (1015 psi) to the cylindrical surface of the core.
3. Measure the permeability of the core to gas in the production direction (from the outlet to the inlet of the cell).
4. Remove the saturating fluid (formation fluid) from above the top of the core plug and replace with an oil based mud (OBM) sample.
5. Heat the cell to the desired operating temperature (82° C. (180° F.)) and apply an overbalance pressure (2.21 MPa; 320 psi) using nitrogen to the oil based mud (at the inlet of the cell).
6. Proceed with the mud placement sequence: 4 hours dynamic (stirring at 1500 RPM), 16 hours static and 1 hour dynamic (stirring at 1500 RPM).
7. Carefully aspirate the liquid from the surface of the core/filtercake that has built up on the surface of the core.
8. Perform the sequence of displacing the cell to base oil (i.e. the same base oil that was used to form the oil based mud), barrier spacers (chemical spacers), clean-up pills, completion brine, etc. as operations dictate and at an overbalance pressure of 2.21 MPa (320 psi).
9. Place the gravel in the carrier fluid to form a slurry and place this slurry in the cell on top of the core plug (that has a filter cake on the upper surface thereof).
10. Place a gravel pack screen on top of the gravel slurry.
11. Apply a pressure of 2.21 MPa (320 psi) for 6 hours to the gravel pack fluid (gravel suspended in the carrier fluid), reduce to balance for 3 days (i.e. release the pressure to atmospheric pressure).
12. Initiate flow of gas in the production direction. Record the pressure of gas required to initiate flow.
13. Measure permeability of the core to gas in the production direction. The amount of formation damage can then be calculated by comparison with the initial permeability of the core to gas.

The formation damage tests were performed with conventional HEC (hydroxyethyl cellulose) water based carrier fluid following OBM placement; with water-in-oil emulsion based carrier fluid following OBM placement and with water-in-oil emulsion based carrier fluid only. The results are shown in the table below:

| | OBM followed by Conventional Water-Based HEC Carrier Fluid | OBM followed by Water-in-Oil Emulsion-Based Carrier Fluid | Water-in-Oil Emulsion-Based Carrier Fluid Only |
|---|---|---|---|
| Core | Berea | Berea | Berea |
| Initial Permeability in Production Direction (mD) | 435 | 355 | 201 |
| Regained Permeability in Production Direction (mD) at Step 13 | 234 | 218 | 188 |
| Pressure to Initiate Flow, MPa (psi) | 0.345 (50) | 0 | 0.069 (10) |
| Damage (%) | 46 | 39 | 6 |
| Carrier Fluid Separation Comments | Carrier fluid did not break | Carrier fluid broke | Carrier fluid broke |

The test with water-in-oil emulsion-based carrier fluid placement following the OBM placement gave 39% damage compared to 46% damage for the conventional HEC water based carrier fluid. A further test with water-in-oil emulsion-based carrier fluid alone resulted in only 6% damage. The pressure to initiate flow was also significantly lower with the oil based carrier fluid.

Laboratory Tests with Formulation 2:
1. Emulsion Separation and Gravel Settling Tests The tests were performed using the following procedures:
1. 500 ml of a water-in-oil emulsion (carrier fluid) was prepared at room temperature using a Silverson mixer by: mixing separately the aqueous phase (stir for 5 minutes at 5000 RPM) and the oil phase (stir for 5 minutes at 5000 RPM); adding half of the aqueous phase to the oil phase (stir for 5 minutes at 7000 RPM); and then adding the remaining half of the aqueous phase (stir for 5 minutes at 7000 RPM).
2. 398 ml of the carrier fluid was placed into a Hamilton Beach mixer cup.
3. 238.8 g of gravel was added to the carrier fluid in the mixer cup (final volume approx 500 ml).

4. The gravel and emulsion were mixed for 30 seconds using the Hamilton Beach mixer.
5. The resulting suspension of gravel in the carrier fluid was placed in a 500 ml graduated cylinder.
6. The cylinder was placed in an oven heated to a temperature of 104° C. (220° F.)
7. The contents of the cylinder were monitored for fluids separation against time and sand (gravel) settling.

| 20/40 Carbolite Gravel, 104° C. (220° F.) | | |
|---|---|---|
| Time (min) | Emulsion Separation (%) | Gravel Settling (%) |
| 5 | 5.0 | 2.9 |
| 10 | 7.5 | 4.3 |
| 20 | 12.5 | 7.1 |
| 30 | 17.5 | 10.0 |
| 60 | 32.5 | 18.6 |
| 120 | 57.5 | 32.9 |
| 180 | 77.8 | 47.1 |
| 24 hr | 88.9 | 100 |
| 48 hr | 100 | 100 |

2. Formation Damage Tests

In this series of tests conventional HEC water-based carrier fluid and water-in-oil emulsion based carrier fluid were tested for formation damage using the field core plugs. In both tests oil based mud (OBM) placement was performed first followed by a gravel placement using a slurry of the gravel in the carrier fluid. The same testing protocols as described above were implemented. The testing temperature was 104° C. (220° F.).

| | OBM followed by Conventional Water-Based HEC Carrier Fluid | OBM followed by Water-in-Oil Emulsion - Based Carrier Fluid |
|---|---|---|
| Core | Field Core | Field Core |
| Initial Permeability in Production Direction (mD) | 93 | 97 |
| Regained Permeability in Production Direction (mD) | 52 | 63 |
| Pressure to Initiate Flow, MPa (psi) | 0.414 (60) | 0.310 (45) |
| Damage (%) | 44 | 35 |
| Carrier Fluid Separation Comments | Carrier fluid did not break | Carrier fluid broke |

The test with the water-in-oil emulsion based carrier fluid placement following the OBM placement gave 35% damage compared to 44% damage for the conventional HEC water based carrier fluid. The pressure to initiate flow was also lower with the water-in-oil emulsion based carrier fluid.

Laboratory Tests with Formulation 3:

The tests were performed using the following procedures:
1. 100 ml of a water-in-oil emulsion (carrier fluid) was prepared at room temperature using a Silverson mixer by: mixing separately the aqueous phase (stir for 5 minutes at 5000 RPM) and the oil phase (stir for 5 minutes at 5000 RPM); adding half of the aqueous phase to the oil phase (stir for 5 minutes at 6000 RPM); and then adding the remaining half of the aqueous phase (stir for 5 minutes at 6000 RPM).
2. 100 ml of the carrier fluid was placed into a 100 ml graduated cylinder.
3. 100 ml of the carrier fluid was placed into a 100 ml temperature resistant bottle.
4. The cylinder was placed in an oven heated to a temperature of 60° C.
5. The temperature resistant bottle was placed in an oven heated to a temperature of 135° C.
6. The contents of the cylinder and bottle were monitored for fluids separation against time.

| Emulsion Separation, % | | |
|---|---|---|
| Time (hrs) | 60° C. | 135° C. |
| 3 | 2.5 | 40 |
| 24 | 20 | 50 |
| 48 | 40 | 75 |
| 72 | 100 | 100 |

Laboratory Tests with Comparative Formulation 4

The tests were performed using the following procedures:
1. 500 ml of a water-in-oil emulsion (carrier fluid) was prepared at room temperature using a Silverson mixer by: mixing separately the aqueous phase (stir for 5 minutes at 5000 RPM) and the oil phase (stir for 5 minutes at 5000 RPM); adding half of the aqueous phase to the oil phase (stir for 5 minutes at 7000 RPM); and then adding the remaining half of the aqueous phase (stir for 5 minutes at 7000 RPM).
2. 398 ml of the carrier fluid was placed into a Hamilton Beach mixer cup.
3. 238.8 g of gravel was added to the carrier fluid in the mixer cup (final volume approx 500 ml).
4. The gravel and carrier fluid were mixed for 30 seconds using the Hamilton Beach mixer.
5. The resulting suspension of gravel in the carrier fluid was placed into a 500 ml graduated cylinder.
6. The cylinder was placed in an oven heated to a temperature of 82° C. (220° F.).
7. The contents of the cylinder were monitored for fluids separation against time and sand (gravel) settling

| 20/40 Carbolite Gravel, 82° C. (180° F.) | | |
|---|---|---|
| Time (min) | Emulsion Separation (%) | Gravel Settling (%) |
| 5 | 10 | 5.9 |
| 10 | 20 | 11.8 |
| 15 | 50 | 29.4 |
| 20 | 67.5 | 39.7 |
| 25 | 72.5 | 42.6 |
| 30 | 77.5 | 45.6 |
| 35 | 80 | 47 |
| 60 | 80 | 47 |
| 120 | 80 | 47 |
| 180 | 100 | 100 |

The water-in-oil emulsion that acts as the carrier fluid in the formulation of the comparative example contains only 0.2 vol % of sorbitan monooleate. The emulsion broke very quickly and was not suitable for use as a gravel packing composition.

The invention claimed is:

1. A method of making a gravel packing composition comprising mixing
   i) a water-in-oil emulsion having an emulsion breaking time of between 24 and 96 hours, which emulsion comprises:
      a) an organic continuous phase comprising 0.1 to 5 vol % of the emulsion of non-ionic or cationic surfactant and 0.25 to 3 vol % of the emulsion of sorbitan ester;
      b) a dispersed aqueous phase comprising 0.05 to 3 vol % of the emulsion of a partial ester of a polyol with at least one $C_6$ to $C_{22}$ fatty acid and at least one of an acid, an acid precursor and a chelating agent; and c) a density control agent; and ii) gravel.

2. A method of packing a wellbore in a subterranean formation, the method comprising adding a water-in-oil emulsion to the wellbore, wherein the water-in-oil emulsion comprises:

a) an organic continuous phase comprising 0.1 to 5 vol % of the emulsion of non-ionic or cationic surfactant and 0.25 to 3 vol % of the emulsion of sorbitan ester;

b) a dispersed aqueous phase comprising 0.05 to 3 vol % of the emulsion of a partial ester of a polyol with at least one $C_6$ to $C_{12}$ fatty acid and at least one of an acid, an acid precursor and a chelating agent; and c) a density control agent;

wherein the nonionic or cationic surfactant comprises an ester of a polymerized unsaturated monocarboxylic fatty acid and wherein the emulsion has an emulsion breaking time of between 24 and 96 hours.

\* \* \* \* \*